United States Patent [19]

Langford et al.

[11] Patent Number: 5,518,661
[45] Date of Patent: May 21, 1996

[54] PAINT STRIPPER CONTAINING BENZYL ALCOHOL OR ALKYL-SUBSTITUTED DERIVATIVE AND METHYLENE CHLORIDE OR OTHER CHLORINATED ALKANE

[75] Inventors: Nathaniel P. Langford, Croix, Wis.; David W. Erismann, Newport, Minn.

[73] Assignee: Minnesota Mining and Manufacturing Company, St. Paul, Minn.

[21] Appl. No.: 443,777

[22] Filed: May 18, 1995

Related U.S. Application Data

[63] Continuation of Ser. No. 242,379, May 13, 1994, abandoned, which is a continuation-in-part of Ser. No. 137,832, Oct. 15, 1993, abandoned.

[51] Int. Cl.$^6$ ................... C11D 7/50; C23G 5/02
[52] U.S. Cl. ............. 252/364; 252/171; 252/DIG. 8
[58] Field of Search .................. 252/171, DIG. 8

[56] References Cited

U.S. PATENT DOCUMENTS

| | | | |
|---|---|---|---|
| 3,094,491 | 6/1963 | Greminger, Jr. et al. | 252/170 |
| 3,391,085 | 7/1968 | Crockett | 252/162 |
| 3,574,123 | 4/1971 | Langle | 252/162 |
| 3,664,962 | 5/1972 | Kelly et al. | 252/125 |
| 3,988,256 | 10/1976 | Vandermey et al. | 252/171 |
| 4,056,403 | 11/1977 | Cramer et al. | 134/22 |
| 4,269,724 | 5/1981 | Hodson | 252/171 |
| 4,294,729 | 10/1981 | Bakes et al. | 252/545 |
| 4,445,939 | 5/1984 | Hodson | 134/2 |
| 4,530,776 | 7/1985 | Hisamoto et al. | 252/153 |
| 4,645,617 | 2/1987 | Vivian | 252/165 |
| 4,732,695 | 3/1988 | Francisco | 252/162 |
| 4,986,936 | 1/1991 | Wolbers | 252/170 |
| 5,073,289 | 12/1991 | Collier et al. | 252/162 |
| 5,185,235 | 2/1993 | Sato et al. | 430/331 |

OTHER PUBLICATIONS

*Encyclopedia of Chemical Technology*, 2nd Ed., vol. 14 (1967), pp. 485–489.
Sweeney, T. F., "Safe Strippers Get Tough", *Practical Homeowner*, Jul./Aug. (1991), pp. 21–24.
Rabuska, J., *The Paint Dealer*, Mar. 1993, pp. 16–18.

*Primary Examiner*—Richard L. Raymond
*Assistant Examiner*—Brian G. Bembenick
*Attorney, Agent, or Firm*—Gary L. Griswold; Walter N. Kim; Doreen S. L. Gwin

[57] ABSTRACT

A paint stripper composition comprising benzyl alcohol or a derivative thereof and a chlorinated alkane.

15 Claims, No Drawings

PAINT STRIPPER CONTAINING BENZYL ALCOHOL OR ALKYL-SUBSTITUTED DERIVATIVE AND METHYLENE CHLORIDE OR OTHER CHLORINATED ALKANE

This is a continuation of application Ser. No. 08/242,379, filed May 13, 1994 (abandoned), which is a continuation-in-part of application Ser. No. 08/137,832, filed Oct. 15, 1993, now abandoned.

This invention relates to an improved organic paint stripper composition containing methylene chloride, the method of formulating the composition, and its use in stripping or removing paint, varnish, and other coatings from coated substrates, such as metal and wood.

Paint strippers containing methylene chloride as a major component are versatile and important strippers used for about 50 years on a variety of coated materials or substrates, such as metal and wood, to strip or remove coatings of paint therefrom (see Kirk-Othmer, *Encyclopedia of Chemical Technology*, 2nd Ed., Vol. 14 (1967), pp. 485–489, and U.S. Pat. No. 5,073,289 (Collier et al.). Because of environmental and health concerns about methylene chloride, sales of this chemical have dropped and formulators of paint strippers have been racing in recent years to develop safe or more benign alternatives to methylene chloride paint strippers (Sweeney, T. F., "Safe Strippers Get Tough", *Practical Homeowner*, July/August (1991), pp. 21–24). Despite the concern about the safety of using methylene chloride (many consider it to be a carcinogen), it is still one of the best strippers available and finding alternatives has proven complicated (Rabuska, J., *The Paint Dealer*, March (1993), pp. 16–18).

A number of patents describe various methylene chloride strippers. U.S. Pat. No. 5,073,289 (Collier et al.) describes a paint stripper comprising methylene chloride solvent as the major component, waxes, and certain carbonyl additives to retard the evaporation of the solvent from the stripper. U.S. Pat. No. 4,645,617 (Vivian) describes a stripping composition comprising a major portion of methylene chloride, a wax, and, to retard evaporation, propylene carbonate, ethylene carbonate, and/or a plasticizer, surfactants and organic co-solvent (particularly methanol) often employed with methylene chloride. U.S. Pat. No. 4,445,939 (Hodson) describes a stripping and conditioning solution by mixing in special proportions (1) a chlorinated solvent (preferably methylene chloride) in an amount generally from 50 to 70 percent by weight of the solution, and a liquid alcohol containing at least three carbon atoms, such as, for example, benzyl alcohol, in an amount generally from 6 to 26 percent by weight of the solution, (2) a certain wetting composition, and (3) a vapor suppressant, and preferably a small amount of water, generally 0.5 to 5 percent by weight. U.S. Pat. No. 4,269,724 (Hodson) describes a paint stripper comprising methylene chloride as the principal solvent and principal component, iso-propyl alcohol to assist in the stripping action, and a certain amine-glycolate acid salt. U.S. Pat. No. 3,988,256 (Vandermey et al.) describes a photoresist rinse comprising about 65 to about 98.5 weight percent methylene chloride and from about 1.5 to about 35 weight percent of isopropanol, tertiary butanol, or mixtures thereof. U.S. Pat. No. 3,574,123 (Langle) describes a paint stripping composition comprising (a) from 50 to 90 parts of a chlorinated liquid hydrocarbon solvent (preferably methylene chloride), (b) from 2 to 15 parts of a lower aliphatic alcohol or certain glycol ether, (c) 0.1 to 15 parts of a lower carboxylic acid, (d) 2 to 30 parts of hydroxybenzenes such as phenols or their derivatives, and (e) 2 to 10 parts fatty acid sulfonate or certain fatty amine carboxylic acid or alkyl benzene sulfonic acid or salts thereof, (f) 0.1 to 10 parts of ammonium bifluoride dissolved in 3 to 20 parts of water, and optionally, evaporation retarders and thickeners. U.S. Pat. No. 3,391,085 (Crockett) describes an acidic stripping composition comprising a mixture of 40–71 percent methylene chloride, 2–8 percent formic acid, 12–30 percent phenol, 3 to 20 percent water, and 1–5 percent p-toluenesulfonic acid. And U.S. Pat. No. 3,094,491 (Greminger, Jr. et al.) describes a paint, lacquer, and varnish remover composition consisting of (a) from 1 to 10 percent by weight of certain cellulose ethers as a thickener, (b) 85 to 98 percent a solvent consisting essentially of methylene chloride, and (c) 1 to 5 percent of mannitan stearate or sorbitan stearate as an evaporation retardant.

Kirk-Othmer, supra, also describes other organic solvents that can soften paint film are, in (approximate) decreasing order of effectiveness, ketones, esters, aromatic hydrocarbons, alcohols, and aliphatic hydrocarbons; they are said not to approach methylene chloride in effectiveness, however, and their flammability is a disadvantage. And the patent literature describes such strippers, a recent patent being U.S. Pat. No. 4,986,936 (Wolbers) which describes a varnish removing aqueous solution comprising a first solvent comprising ketone, a second solvent which is cyclohexanol, methyl cyclohexanol, or pyridine, a gelling agent, and a certain gelling agent activator. U.S. Pat. No. 4,732,695 (Francisco) describes a paint stripper and coatings remover composition free of methylene chloride, consisting essentially of a mixture of effective amounts of benzyl alcohol (which can range from about 20 to about 50%), aromatic hydrocarbon solvent, known as "aromatic naphtha", such as the material marketed as "Aromatic 100" by Exxon Chemicals (the amount of which solvent can range from about 30 to about 70%), and a pyrrolidone (which can range from 10 to 40%; a thickener and other additives can be included in the paint stripper. U.S. Pat. No. 4,294,729 describes a composition containing an alcohol such as benzyl alcohol for removing epoxy polymer from a substrate. And U.S. Pat. No. 3,664,962 (Kelly et al.) describes a stain remover which includes benzyl alcohol.

Briefly, this invention, in one aspect, provides an improved stripper composition comprising a solvent mixture comprising benzyl alcohol, as the major active solvent component by weight of the mixture, and methylene chloride, as the minor active solvent component by weight of the mixture.

In another aspect of this invention, instead of or in admixture with the benzyl alcohol component of the above-described improved stripper composition, a normally liquid, lower alkyl-substituted benzyl alcohol can be used, such as alpha-methyl benzyl alcohol, 2-methyl benzyl alcohol, or 4-methyl benzyl alcohol. A class inclusive of benzyl alcohol and such alkyl-substituted derivatives thereof which can be used in this invention is that represented by the general formula:

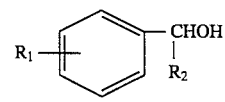

where $R_1$ and $R_2$ are independently selected from the group consisting of a hydrogen atom and a lower alkyl group having 1 to 4 carbon atoms such as a methyl group.

In a still further aspect of this invention, instead of or in admixture with the methylene chloride component, $CH_2Cl_2$, of the above described improved stripper compositions, a normally liquid homolog of methylene chloride can be used, such as chlorinated alkanes with 2 or 3 carbon atoms and 2 or 3 chlorine atoms, examples of which are 1,1,1-trichloroethane, 1,1,2-trichloroethane, 1,1-dichloroethane, 1,2-dichloroethane, and 1,2-dichloropropane.

The stripper composition of this invention can also contain water stably-emulsified with said solvent mixture to form a water (or aqueous) phase and a solvent phase in a water-solvent emulsion, which can be of the oil-in-water emulsion type or the water-in-oil emulsion type. This latter type of emulsion, in which the solvent mixture is the continuous phase, can be characterized as a solvent-based stripper system and it is the preferred embodiment of the stripper composition of this invention because of its lower volatility, or evaporation rate, as compared to the oil-in-water system, which can be characterized as a water-based system.

In the above-described solvent-based system the solvent mixture further comprises or includes, as a solvent diluent, an aromatic hydrocarbon liquid having a high flash point (closed cup), generally at least about 80° F. (26.7° C.), preferably at least 100° F. (37.8° C.) to 150° F. (65.6° C.), more preferably at least 200° F. (93.3° C.), which is insoluble in water, unreactive therewith and with other components in the stripper composition, and inert in the storage and use thereof. Such aromatic hydrocarbon liquid can be that comprising alkyl-substituted benzene, for example, trimethyl benzene, xylene, cumene, ethyl benzene, and mixtures thereof. A class of such alkyl-substituted benzenes can be represented by the general formula:

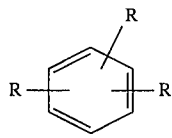

where each R is independently selected from the group consisting of a hydrogen atom and alkyl, e.g., with 1 to 4 carbon atoms, such as methyl, with the proviso that at least one R is alkyl. The aromatic hydrocarbon liquid can also be that comprising naphthalene, methyl napthalene, or mixtures thereof. Mixtures of said alkyl-substituted benzenes and said napthalenes can also be used. A particularly useful aromatic hydrocarbon liquid which can be used for this purpose is "Aromatic 200," a commercially-available product of Exxon Chemicals Co., which has a flash point (TCC) of 220° F. (104.4° C.). Another particularly useful aromatic hydrocarbon liquid which can be used is "Aromatic 100" (also available from Exxon Chemicals Co.) which has a flash point (TCC) of 108° F. (42.2° C.). Optionally, but preferably, the stripper compositions of this invention also contains an evaporation retarder, such as a paraffin wax, e.g., that which is commercially available as "Boler 1070," and also contains a thickener, such as a hydroxpropylcellulose; and the emulsion types of the strippers of this invention also contain surfactants used to form and stabilize the emulsions, such as "Tween 80", "Span 80," and "Dowfax 2A-1."

The stripper compositions of this invention are normally liquid, paste, or semi-paste and can be prepared by mixing in a suitable kettle, provided with an agitator, the benzyl alcohol or alkyl-substituted derivative thereof, and part (about ½ to ¾) of the aromatic hydrocarbon (where used) to form part of the solvent mixture, then adding, for the emulsion types of strippers, the appropriate surfactants (or surface active agents or emulsifiers) to the resulting solvent mixture, followed by adding water (where used), thickener(s), the balance of the aromatic hydrocarbon mixed with the evaporation retarder, and, finally, the methylene chloride (the last-to-add component due to its volatility) or the homolog thereof. The stripper can be suitably packaged in sealed containers, such as fluorinated polyethylene plastic bottles.

In using the paint stripper, it can be applied to the painted or otherwise coated substrate having a solvent-soluble or solvent-swellable coating (which can be the type stripped with methylene chloride per se or benzyl alcohol per se), which one desires to strip or remove from the substrate. The stripping can be, for example, for purposes of refinishing the substrate by coating it with a new or different decorative or protective coating. The coated substrate can be horizontal or it can be inclined or vertical; in the latter case, incorporating sufficient thickener in the stripper composition, to minimize or prevent it from running down or dripping from the substrate after application of the stripper, will be a preferred option. The stripper can be applied to the coated substrate by any suitable technique, such as by brushing, roller-coating, or, if its viscosity permits, by spraying, including aerosol spraying. Following application of the stripper to the coated substrate, and allowing it to reside thereon in a sufficient amount for a sufficient time and at an appropriate temperature, e.g., a 1 to 10 mm coating for 5 minutes to 2 hours or more at room temperature (20° C.), depending, for example, on the nature and thickness of the coating, the solubilized, softened, blistered, or released coating can be removed from the substrate by appropriate techniques, including wiping, scraping, or rubbing the released coating or residue off the substrate with a rag, scraper, or other mechanical means or by washing it off with water or other appropriate liquid. If desired or necessary, the application of the stripper to the so-treated coated substrate, and removal of the further treated residual coating, can be repeated one or more times until the desired stripping is achieved.

The paint stripper composition of this invention is relatively low in cost and relatively safe to use in that it has a relatively high flash point (generally at least 100° F. (37.8° C.) to 150° F. (65.5° C.), preferably at least 200° F. (93.3° C.), or higher), is non-flammable at normal conditions of storage and use, and has low volatility and thus sufficiently-long stripping activity while disposed or retained for the desired period of time on the coated substrate treated therewith. The minor amount of methylene chloride (or homolog thereof) in the stripper minimizes or alleviates the environmental or health concerns commonly associated with methylene chloride-containing paint strippers, the evaporation of the methylene chloride being retarded by the evaporation retarder in the stripper. And, surprisingly, the period of time necessary for the paint stripper of this invention to effectively act fast on the treated coating to permit its ready release and removal, by the techniques mentioned above, is substantially less than it would take benzyl alcohol per se, or benzyl alcohol in admixture with an aromatic hydrocarbon such as "Aromatic 200," as strippers to accomplish the same stripping result as the stripper of this invention. The effective stripping activity of the latter, even though the methylene chloride is only a minor component of the solvent mixture thereof and is even less in the stripper as a whole, while the activity is not as fast as that of methylene chloride per se, it is still fast enough to satisfy many stripping requirements, such as that of the "do-it-yourself" homeowner who could use it, for example, in stripping and refinishing woodwork, kitchen cabinets, antiques, furniture, pianos, floors, paneling, boats, etc. And industrial users, e.g., automobile manufacturers, will also find that the stripper of this invention can advantageously be used in many applications where the heretofore-use of methylene chloride has been banned or discontinued due to the environmental and health concerns associated with such solvent, notwithstanding its outstanding stripping activity.

The stripper composition of this invention can be used on a host of coated substrates, such as wood, metal, and cementitious substrates concrete, stone, and glass, to remove an old, cured, or unwanted decorative protective or other utilitarian coating of natural or synthetic resins or polymers, such as acrylates, which can be in the form of latex paint, alkyd paint, varnish, lacquer, enamel, shellac, and polyurethane coating, such as those which are readily stripped by methylene chloride per se. Such coatings, whether a single layer or film or multiple layers of the same or different coatings, e.g., a final or finish enamel coated over primer(s), can be readily penetrated and loosened or released from the substrate, though the depth and time of penetration or effective stripping action will vary, depending on the nature of the coating, method and amount of stripper application, and the particular formulation of the stripper.

In formulating the stripper of this invention, the relative amount of methylene chloride mixed with the benzyl alcohol component in making up the solvent mixture will be a small or minor amount sufficient to increase or improve the inherent stripping activity of the benzyl alcohol component (which by itself or in a methylene chloride-free stripper formulation is effective in removing the coating, albeit the time to do so is much longer, for example, twice as long or longer). Generally, the weight ratio of the benzyl alcohol component to the methylene chloride component in the stripper compositions of this invention can range from 1 to 15 parts by weight benzyl alcohol to less than one part by weight methylene chloride, the preferred ratio being 3 to 5 parts by weight benzyl alcohol to one part by weight methylene chloride. Where the alkyl-substituted benzyl alcohol and/or the methylene chloride homolog is used, the corresponding amounts and ratios described or recited above for benzyl alcohol and methylene chloride can be used.

The amount of the aromatic hydrocarbon component in the stripper composition of this invention can vary and will be governed by cost-effectiveness considerations, in that the aromatic hydrocarbon may have little or essentially no stripping or solvent action itself and function as a cost-reducing, inert diluent in the stripper compositions. Generally, the amount of the aromatic hydrocarbon component formulated in a stripper of this invention can range from 5 to 45, or even as high as 60, percent by weight, preferably 10 to 35 or to 40 percent by weight, of the stripper composition. The "Aromatic 200" hydrocarbon liquid is the aromatic hydrocarbon preferred in the solvent-based strippers of this invention. It is essentially an all aromatic product, having a flash point, TCC, of 220° F., an evaporation rate, n-butylacetate=100, of <0.1, and a solubility in water of <0.1 wt % at 68° F. (20° C.). The "Aromatic 100" hydrocarbon liquid comprises a mixture of trimethylbenzene, xylene, cumene, ethylbenzene, and petroleum hydrocarbons and this liquid product has a flashpoint, TCC, of 108° F. (42.2° C.), an evaporation rate, n-butylacetate=100, of 0.3, and a solubility in water of 0.02 at 77° F. (25° C.).

The relative amount of the water in the emulsion stripper compositions of this invention can vary and functionally speaking will be an amount sufficient to enhance the marketing appeal or cost of the stripper composition. Generally, the water component can range from 1 to 45 percent by weight, preferably 20 to 35 percent by weight, of the stripper composition. (The water component of the stripper composition does not affect the stripping activity). And generally the amount of the solvent mixture can range from 45 to 99 percent by weight, preferably 50 to 80 percent by weight, of the stripper formulation.

To retard the evaporation rate of the methylene chloride (or homolog thereof) component (a minor portion by weight of the stripper composition), although it will be relatively low as compared to conventional methylene chloride-containing strippers, various substances can be included in the formulation of the stripper composition of this invention including those retarders conventionally incorporated in those conventional strippers. The relative amount of such evaporation retarders will vary and be dependent on such factors as the particular amount of methylene chloride component (or homolog thereof) in the stripper composition of interest or choice and on the conditions under which it is used, though adequate ventilation of the site of stripping is recommended. Generally, though, the amount of evaporation retarder to be optionally, but preferably, used, is 0.25 to 5 percent by weight, preferably 1 to 2 percent by weight, of the stripper composition.

Evaporation retarders found to be particularly useful in this invention are normally solid paraffin waxes, such as that sold as "Boler 1070" and "Boler 1071." Other evaporation retarders that can be used in this invention include those mentioned by Kirk-Othmer, supra, such as stearin, cersin, and microcrystalline waxes and those described in said U.S. Pat. No. 4,645,617, such as propylene carbonate or ethylene carbonate. By thus controlling the evaporation rate, the stripper composition when applied to the coated substrate has a longer time to work on the coating. Of course, with a lower rate of evaporation (particularly of the methylene chloride component) the person using the stripper composition is exposed to much lower, if not innocuous, levels of methylene chloride.

Thickeners which can be included in the stripper compositions of this invention to increase its viscosity, even to confer paste or semi-paste properties to the stripper compositions, include those heretofore added to known stripper compositions. The purpose of the thickener is to stabilize the solvent/water emulsion and provide good flow control, i.e., the presence of thickener allows the composition to be applied easily, level out, and have the ability to cling to a vertical surface for a sufficient period of time for the solvent to soften the coating on the surface. It is recommended that the thickener be swellable in water in the case of the water-based stripper and swellable in the solvent mixture in the case of the solvent-based stripper, and be capable of promoting formation of a stable emulsion of the composition of this invention. Thickeners that can be used in the stripper composition of the present invention include gums, e.g., xanthan, guar, and locust bean, alginates, polyvinyl alcohol, polyacrylates, starches, clay derivatives, e.g., amine-treated magnesium aluminum silicate, and cellulose derivatives, e.g., hydroxypropyl methylcellulose, such as that sold as "Methocel 311." The amount of thickener used is that sufficient to impart to the formulation the desired rheology and stability. Generally, the amount of the thickener will be 0.1 to 5 percent by weight, preferably 0.4 to 1 or 1.5 percent by weight, of the stripper composition.

The amount of surfactant that can be used to emulsify the solvent and water phases of the stripper composition of this invention, and to maintain or stabilize the resulting emulsion during storage and use of the stripper composition, will be relatively low. The surfactant of choice and the amount thereof can be selected by simple empirical emulsion trials, using cationic, anionic, non-ionic, or amphoteric surfactants for that purpose. Generally, though the amounts of surfactant to be so-used can be 0.1 to 3 percent by weight, preferably 0.25 to 1 or to 1.5 percent by weight, of the stripper composition.

The surfactants suitable for the stripper composition of this invention preferably have an HLB value of from about 4 to about 18, preferably 4 to 12. If a blend of surfactants is used, it is preferred that the blend have an overall HLB value of from about 4 to about 18, preferably 4 to 12. The particular HLB value required is dependent upon the organic solvent selected.

Surfactants that can be used to prepare the stripper composition of the present invention are, for example, polyoxyethylated fatty amines, polyoxyethylated ethers, polyoxyethylated sorbitan esters, polyoxyethylated sorbitol esters, dodecyl benzene sulfonic acid salts, polyalkylene oxide-modified methylpolysiloxanes, alkylphenol ethyoxylates, polyoxyethylene sorbitan fatty acid esters, and sorbitan fatty acid esters. Commercially available surfactants which are preformed are "Tween 80" polyoxyethylene sorbitan monooleate, "Span 80" sorbitan monooleate, and "DOWFAX 2A1" benzene-1,1-oxybis, tetrapropylene derivatives, sulfonated, sodium salts.

Selection of the particular surfactant can be facilitated by the procedures described in Kirk-Othmer Encyclopedia of Chemical Technology, Third Edition, Vo. 8, John Wiley & Sons, Inc. (1979), pp. 909–919, incorporated herein by reference, or by the procedures described in the "HLB System, a time-saving guide to emulsifier selection," ICI United States Inc., Specialty Chemicals Division (1976).

Table I below sets forth various formulations of stripper compositions of this invention which were evaluated as described below and compared with six control formulations also set forth in Table I.

Formulations A and Control No. 2 were prepared by simply blending the components together. Formulation B was prepared by mixing a blend of the two active solvents with a mixture of the aromatic hydrocarbon and wax. Formulations C through P were prepared by adding to a kettle, provided with an agitator, benzyl alcohol or an alkyl-substituted derivative thereof, aromatic hydrocarbon, DBE-3 dibasic ester (where used), DOWFAX 2A1 surfactant, a mixture of Tween 80 and Span 80 surfactants, and Hectabrite DP "thickener" (where used). To the resulting mixture, water (deionized) was added to develop a water-in-oil emulsion. Methocel 311 thickener was added to the emulsion, and the resulting mixture was agitated until a constant level of viscosity was reached. A premix of the balance of the aromatic hydrocarbon and the paraffin wax was added to the emulsion. Methylene chloride was then added to the batches. The formulation of Control No. 3 was prepared in the same manner as that of Formulations C to H, except no methylene chloride was added. The formulations of Control Nos. 4, 5, and 6 were prepared like Formulation E, except no benzyl alcohol was used (rather, an alkanol was used).

TABLE I

| Components of formulations | Amounts of Components, wt. % Formulations | | | | | | | | | | | |
|---|---|---|---|---|---|---|---|---|---|---|---|---|
| | A | B | C[b.] | D | E[c.] | F | G | H | I | J | K | L |
| Alcohol: | | | | | | | | | | | | |
| benzyl alcohol | 77.2 | 33.8 | 22.0 | 20 | 22 | 21.9 | 21.9 | 21.9 | | | | 21.9 |
| alpha-methyl benzyl | | | | | | | | | 21.9 | | | |
| 2-methyl benzyl alc. | | | | | | | | | | 21.9 | | |
| 4-methyl benzyl alc. | | | | | | | | | | | 21.9 | |
| isopropanol | | | | | | | | | | | | |
| n-butanol | | | | | | | | | | | | |
| octanol | | | | | | | | | | | | |
| Chlorinated alkane: | | | | | | | | | | | | |
| methylene chloride | 22.8 | 10.0 | 6.5 | 6.5 | 6.5 | 6.5 | 6.5 | 6.5 | 6.5 | 6.5 | 6.5 | |
| 1,1,1-trichloroethane | | | | | | | | | | | | 6.5 |
| 1,1,2-trichloroethane | | | | | | | | | | | | |
| 1,1-dichloroethane | | | | | | | | | | | | |
| 1,2-dichloroethane | | | | | | | | | | | | |
| 1,2-dichloropropane | | | | | | | | | | | | |
| Aromatic hydrocarbon: | | | | | | | | | | | | |
| "Aromatic 100" | | | | | 36.0 | 35.9 | | | 35.9 | 35.9 | 35.9 | 35.9 |
| "Aromatic 200" | | 53.8 | 33.6 | 30.6 | | | | | | | | |
| xylene | | | | | | | 35.9 | | | | | |
| 1,2,4-trimethylbenzene | | | | | | | | 35.9 | | | | |
| Water | | | 34.9 | 35.0 | 31.5 | 32.4 | 32.4 | 32.4 | 32.4 | 32.4 | 32.4 | 32.4 |
| "DBE-3" dibasic ester | | | | 5.0 | | | | | | | | |
| Paraffin wax[a.] | | 2.3 | 1.5 | 1.5 | 1.5 | 1.5 | 1.5 | 1.5 | 1.5 | 1.5 | 1.5 | 1.5 |
| "Methocel 311" cellulose | | | 0.7 | 0.7 | 1.1 | 1.0 | 1.0 | 1.0 | 1.0 | 1.0 | 1.0 | 1.0 |
| "Tween 80" surfactant | | | .275 | .275 | 0.16 | 0.27 | 0.27 | 0.27 | 0.27 | 0.27 | 0.27 | 0.27 |
| "Span 80" surfactant | | | .225 | .225 | .84 | 0.32 | 0.32 | 0.32 | 0.32 | 0.32 | 0.32 | 0.32 |
| "Hectabrite DP" thickener | | | 0.06 | | | 0.05 | 0.05 | 0.05 | 0.05 | 0.05 | 0.05 | 0.05 |
| "Dowfax 2A1" surfactant | | | 0.2 | 0.2 | 0.4 | 0.2 | 0.2 | 0.2 | 0.2 | 0.2 | 0.2 | 0.2 |

TABLE I-continued

| Components of formulations | Amounts of Components, wt. % | | | | | | | | | |
|---|---|---|---|---|---|---|---|---|---|---|
| | Formulations | | | | Control Nos. | | | | | |
| | M | N | O | P | 1 | 2 | 3 | 4 | 5 | 6 |
| Alcohol: | | | | | | | | | | |
| benzyl alcohol | 21.9 | 21.9 | 21.9 | 21.9 | 100 | | 28 | | | |
| alpha-methyl benzyl | | | | | | | | | | |
| 2-methyl benzyl alc. | | | | | | | | | | |
| 4-methyl benzyl alc. | | | | | | | | | | |
| isopropanol | | | | | | | | 21.9 | | |
| n-butanol | | | | | | | | | 21.9 | |
| octanol | | | | | | | | | | 21.9 |
| Chlorinated alkane: | | | | | | | | | | |
| methylene chloride | | | | | | 12.5 | | 6.5 | 6.5 | 6.5 |
| 1,1,1-trichloroethane | | | | | | | | | | |
| 1,1,2-trichloroethane | 6.5 | | | | | | | | | |
| 1,1-dichloroethane | | 6.5 | | | | | | | | |
| 1,2-dichloroethane | | | 6.5 | | | | | | | |
| 1,2-dichloropropane | | | | 6.5 | | | | | | |
| Aromatic hydrocarbon: | | | | | | | | | | |
| "Aromatic 100" | 35.9 | 35.9 | 35.9 | 35.9 | | | | 35.9 | 35.9 | 35.9 |
| "Aromatic 200" | | | | | | 87.5 | 32.6 | | | |
| xylene | | | | | | | | | | |
| 1,2,4-trimethylbenzene | | | | | | | | | | |
| Water | 32.4 | 32.4 | 32.4 | 32.4 | | | 36.2 | 32.4 | 32.4 | 32.4 |
| "DBE-3" dibasic ester | | | | | | | | | | |
| Paraffin wax[a] | 1.5 | 1.5 | 1.5 | 1.5 | | | 1.6 | 1.5 | 1.5 | 1.5 |
| "Methocel 311" cellulose | 1.0 | 1.0 | 1.0 | 1.0 | | | 0.7 | 1.0 | 1.0 | 1.0 |
| "Tween 80" surfactant | 0.27 | 0.27 | 0.27 | 0.27 | | | .275 | .27 | .27 | .27 |
| "Span 80" surfactant | 0.32 | 0.32 | 0.32 | 0.32 | | | .225 | .32 | .32 | .32 |
| "Hectabrite DP" thickener | 0.05 | 0.05 | 0.05 | 0.05 | | | | 0.05 | 0.05 | 0.05 |
| "Dowfax 2A1" surfactant | 0.2 | 0.2 | 0.2 | 0.2 | | | 0.2 | 0.2 | 0.2 | 0.2 |

[a] The paraffin wax used in Formulations B, C, and Control No. 3 was "Boler 1070," that used in Formulation E was "Boler 1071," that used in Formulations E through P was "Petrowax 4212," and that used in Formulation D was "Aristowax" (MP 142° F.).
[b] Formulations C through P were water-in-oil emulsions.
[c] Formulation E also contained 0.02 wt % "X-48" yellow pigment.

A number of stripping evaluations of the formulations of Table I were carried out. In these evaluations, the coated substrates used were those obtained from Advance Coating Tech. Inc., Hillsdale, Mich., U.S.A. They were 4-inch×12-inch (10 cm×30.5 cm) cold-rolled steel panels that were uniformly coated first with a phosphate base coat, then with a grey primer ("PPG-80–703F"), and finally with a white lacquer top coat ("PPG-Walm-3967"). The stripping procedure used in these evaluations was to apply the stripper formulation to a site on the coated surface of the panel in an amount sufficient to cover about 2 cm² which typically was accomplished with 2 drops of the stripper formulation. Several sites on the panel were likewise treated. At given time intervals, beginning immediately after the last drops were applied, each treated site was scraped back and forth with the end of a wooden tongue depressor (namely, ²S/P™ Tongue Blades, size 5¾-inch long×11/16-inch wide) held by hand with the side of the depressor at an angle of about a 45° to the horizontal plane of the treated panel, a uniform moderate pressure being applied by the forefinger to the upper side of the depressor while the scraping was carried out for about 5 seconds. The scraped sites were then visually examined and rated by using a scale devised to record how effective the stripper was at removing paint from the coated substrate, Table II below setting forth the scale. And the total time (after application of the stripper formulation) that it took for complete stripping was recorded.

TABLE II

| Rating | Appearance of stripper-treated site |
|---|---|
| 0 | no effect apparent |
| 1 | off-white (some minimal lacquer top coat removed) |
| 2 | grey-white (about 50% to 70% of top coat removed, but not 100%) |
| 3 | grey (100% of top coat removed) |
| 4 | mottled dull-shiny (partial penetration of outer primer) |
| 5 | uniform shiny (100% of outer primer removed as well as 100% top coat) |

The results of the evaluation according to the foregoing procedure are summarized in Table III.

TABLE III

| | Amounts of Components, wt. % Formulations | | | | | | | | | | | |
|---|---|---|---|---|---|---|---|---|---|---|---|---|
| | A | B | C | D | E<sup>c.</sup> | F | G | H | I | J | K | L |
| Time to remove 100% top coat and 100% outer prime coat, min. | 7 | 7 | 7 | 5 | 4 | | | | | | | |
| Rating*: | | | | | | | | | | | | |
| after 3 min. | 2 | 1 | 2+ | 3 | 3 | 3 | 5 | 3 | 1 | 1 | 3 | 1 |
| after 5 min. | 3 | 3 | 3+ | 5 | 5 | 5 | 5 | 5 | 2 | 3 | 5 | 2 |
| after 7 min. | 5 | 5 | 5 | 5 | 5 | 5 | 5 | 5 | 5 | 5 | 5 | |

| | Amounts of Components, wt. % | | | | | | | | | |
|---|---|---|---|---|---|---|---|---|---|---|
| | Formulations | | | | Control Nos. | | | | | |
| | M | N | O | P | 1 | 2 | 3 | 4 | 5 | 6 |
| Time to remove 100% top coat and 100% outer prime coat, min. | | | | | 15 | ** | 15 | | | ** |
| Rating*: | | | | | | | | | | |
| after 3 min. | 1 | 3 | 5 | 0 | −1 | 0 | −1 | 1 | 1 | 0 |
| after 5 min. | 5 | 5 | 5 | 3 | −1 | 0 | 1 | 2 | 2 | 0 |
| after 7 min. | 5 | 5 | 5 | 4 | −1 | 0 | 2 | 3 | 3 | 0 |

*A minus (−) before a given rating number means a rating somewhat less than the number; and a plus (+) after a given rating number means a rating somewhat more than the number.
**The formulation of Controls 2 and 6 did not penetrate the topcoat.

The data of Table III show formulations of this invention (A through P) are very effective as strippers and are superior to the control formulations (Nos. 1–6). Other control formulations, which were like that of Formulation B except that the benzyl alcohol component was replaced in one control by acetophenone and in another control by ethyl ethoxypropionate, had ratings that were no better than or inferior to the ratings of Control No. 1 (benzyl alcohol). Furthermore, the stripping performance of acetophenone and ethyl ethoxypropionate was not enhanced upon mixing either one with a small amount of methylene chloride.

In another set of evaluations, Formulation D of Table I was applied to 6 plywood panels, each coated with a different coating, the amount of the formulation applied being sufficient to cover about 2 cm$^2$ for each treated site, 5 to 10 such sites being covered at the same time on each panel so that the degree of penetration could be determined at different time intervals following application. After each time interval, each treated site was scraped with a tongue depressor, as described above, the time it took for the stripper formulation to penetrate the coating down to the wood substrate (as visually observed) being recorded. These evaluation and results are summarized in Table IV.

TABLE IV

| Description of coating | Time to penetrate coating down to plywood substrate (min) |
|---|---|
| Polyurethane, "Minwax ™", 3 coats | 30 |
| Varnish, 3 coats | 4 |
| Lacquer, 3 coats | 4 |
| Shellac, "Bullseye ™", 3 coats | 15 |
| Latex paint, 3 colors, 2 coats of each | 30 |
| Alkyd paint, 3 colors, 2 coats of each | 180 |

The data of Table IV show that the stripper composition of this invention is effective in stripping a variety of coating in a relatively short time.

Various modifications and alterations of this invention will become apparent to those skilled in the art without departing from the scope and spirit of this invention.

What is claimed is:

1. A paint stripper composition comprising a solvent mixture comprising (a) benzyl alcohol or alkyl-substituted derivative thereof and (b) methylene chloride or other chlorinated alkane with two or three carbon atoms and two or three chlorine atoms, wherein a ratio, in parts by weight, of the benzyl alcohol or alkyl-substituted derivative thereof to the methylene chloride or other chlorinated alkane ranges from 3:1 to 15:<1.

2. The paint stripper composition according to claim 1, wherein said solvent mixture comprises benzyl alcohol and methylene chloride.

3. A paint stripper composition comprising a solvent mixture comprising (a) benzyl alcohol or alkyl-substituted derivative thereof and (b) methylene chloride or other chlorinated alkane with two or three carbon atoms and two or three chlorine atoms, wherein a ratio, in parts by weight, of the benzyl alcohol or alkyl-substituted derivative thereof to the methylene chloride or other chlorinated alkane ranges from 3:1 to 5:1.

4. The paint stripper composition according to claim 3, wherein said solvent mixture comprises benzyl alcohol and methylene chloride.

5. The paint stripper composition according to any of claims 1, 2, 3, or 4, further comprising water emulsified with said solvent mixture.

6. The paint stripper composition according to any of claims 1, 2, 3, or 4, further comprising water emulsified with said solvent mixture as a water-in-oil emulsion.

7. The paint stripper composition according to claim 6, wherein said solvent mixture further comprises an aromatic hydrocarbon liquid with a flash point above 80° F.

8. The paint stripper composition according to claim 6, wherein said solvent mixture further comprises an aromatic hydrocarbon liquid with a flash point above 150° F.

9. The paint stripper composition according to claim 6, further comprising a thickener.

10. A paint stripper composition comprising:
   (1) an water-in-oil emulsion comprising a water phase and an oil/solvent phase,
   (2) a thickener, and
   (3) an evaporation retarder;
   wherein the oil/solvent phase comprises a solvent mixture comprising
      (a) benzyl alcohol,
      (b) methylene chloride, and
      (c) an aromatic hydrocarbon component having a flash point above 100° F.;
   wherein a ratio, in parts by weight, of the benzyl alcohol to the methylene chloride ranges from 3:1 to 15:<1; and
   wherein said water phase is present in an amount ranging from 1 to 45 weight percent and said oil/solvent phase is present in an amount ranging from 45 to 99 weight percent, said weight percents being based on the weight of the paint stripper composition.

11. The paint stripper composition according to claim 10, wherein the aromatic hydrocarbon is present in an amount ranging from 5 to 60 weight percent based on the weight of the paint stripper composition.

12. The paint stripper composition according to claim 10, wherein said aromatic hydrocarbon component has a flash point above 200° F.

13. The paint stripper composition according to claim 10, wherein said weight percent of said water phase is 20 to 35, said weight percent of said solvent phase is 50 to 80, and said weight percent of said aromatic hydrocarbon is 10 to 40.

14. The paint stripper composition according to claim 13, wherein said evaporation retarder comprises paraffin wax.

15. A method of stripping a coating from a coated substrate, said method comprising applying the paint stripper composition in accordance with any of claims 1, 2, 3, or 4, to the coated surface; allowing the applied composition to remain and act on the coated surface; and removing a residual coating released from the coated substrate treated with the paint stripper composition.

* * * * *